(12) United States Patent
Kim

(10) Patent No.: US 7,681,859 B2
(45) Date of Patent: Mar. 23, 2010

(54) PORTABLE TERMINAL DEVICE HAVING SUPPORTING LEG

(75) Inventor: Dong Han Kim, Asan (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 11/623,392

(22) Filed: Jan. 16, 2007

(65) Prior Publication Data

US 2007/0164191 A1    Jul. 19, 2007

(30) Foreign Application Priority Data

Jan. 17, 2006    (KR) ...................... 10-2006-0005045

(51) Int. Cl.
  *F16M 11/00*    (2006.01)
(52) U.S. Cl. ...................... 248/688; 248/686; 248/351; 248/917
(58) Field of Classification Search ................. 248/686, 248/688, 351, 917
  See application file for complete search history.

(56) References Cited

U.S. PATENT DOCUMENTS

| | | | | |
|---|---|---|---|---|
| 4,516,508 A | * | 5/1985 | Kako et al. ..................... | 108/7 |
| 4,734,945 A | * | 4/1988 | Wright ............................. | 5/11 |
| 6,097,592 A | * | 8/2000 | Seo et al. ..................... | 361/683 |
| 6,880,796 B2 | * | 4/2005 | Khor et al. ................... | 248/677 |
| 7,364,126 B2 | * | 4/2008 | Tsai et al. ................ | 248/188.8 |
| 7,425,948 B2 | * | 9/2008 | Ling et al. .................. | 345/179 |
| 2006/0221263 A1 | * | 10/2006 | Ogawa et al. ............... | 348/794 |
| 2006/0237623 A1 | * | 10/2006 | Sung .......................... | 248/688 |
| 2007/0012856 A1 | * | 1/2007 | Chan et al. .................. | 248/677 |

* cited by examiner

*Primary Examiner*—J. Allen Shriver, II
*Assistant Examiner*—Bradley H Duckworth
(74) *Attorney, Agent, or Firm*—Fish & Richardson P.C.

(57) ABSTRACT

A portable terminal device includes a supporting leg which makes it possible to watch television in a standing state of the terminal device. The portable terminal device comprises a main body having a mounting groove formed in a rear surface thereof to have a predetermined length, the mounting groove having a plurality of catching grooves formed in one inner side surface thereof; and a supporting leg assembly having an end rotatably supported in the mounting groove. The supporting leg assembly comprises a supporting leg including a leg portion having a predetermined length, and a hollow head portion formed at one end of the leg portion and having one side opened. A cam member is inserted and supported in the head portion of the supporting leg with a spring received therein to be movable within a certain section in an axial direction. The cam member has a cam protrusion protruding outward to be caught to one of the catching grooves by an elastic force of the spring.

7 Claims, 4 Drawing Sheets

PORTABLE TERMINAL DEVICE HAVING SUPPORTING LEG

BACKGROUND

1. Technical Field

This document relates to a portable terminal device such as a personal digital assistant (PDA), and more particularly, to a portable terminal device including a supporting leg.

2. Description of the Related Art

Recently, a satellite or terrestrial broadcasting service is provided through a portable terminal device such as a cellular phone and a personal digital assistant (PDA), so that it is possible to watch television through the portable terminal device.

SUMMARY

In one generally aspect, a portable terminal device is provided with a supporting leg to enable a user to watch television conveniently. The supporting leg may be capable of maintaining the terminal device at an optimum supporting angle for watching television, and may be adjustable to permit user adjustment of the a supporting angle. To this end, a portable terminal device may include a main body having a mounting groove and a supporting leg having an end rotatably supported in the mounting groove. The mounting groove may have at least one catching groove formed in one inner side surface thereof, and the supporting leg may include a protruding portion protruding outward to be caught by at least one catching groove. Alternatively, the supporting leg may include a head portion formed at the end of the supporting leg and a cam member inserted and supported in the head portion of the supporting leg with a spring received therein to be movable within a certain section in an axial direction. The cam member may have a cam protrusion protruding outward to be caught by one of the catching grooves by an elastic force of the spring.

The cam protrusion may be selectively caught by one of the catching grooves, so that the supporting leg can support the main body in a standing state thereof or can be received in the mounting groove of the main body. In addition, it may be possible to adjust an angle at which the supporting leg supports the main body.

In another general aspect, a portable terminal device includes a main body having a mounting groove formed in a rear surface thereof to have a predetermined length, and a supporting leg assembly having an end rotatably supported in the mounting groove. The supporting leg assembly comprises a supporting leg including a leg portion having a predetermined length, and a hollow head portion formed at one end of the leg portion and having one side opened, and a cam member inserted and supported in the head portion of the supporting leg with a spring received therein to be movable within a certain section in an axial direction. The cam member may have a cam protrusion protruding outward. Here, the mounting groove has a catching groove formed at a position of one side surface thereof in which the supporting leg stands and supports the main body, and the cam protrusion is elastically caught to one of the catching grooves by the spring.

The supporting leg may support the main body in its standing state at a certain angle, so that a user may conveniently watch television. The cam member may be supported by a supporting pin in a state where the cam member is inserted in the head portion. The supporting pin may pass through an elongated hole formed in the head portion and be inserted into a support hole formed in the cam member, and the elongated hole may be formed in the axial direction to have a predetermined length.

In another general aspect, a method of manufacturing a portable terminal device includes providing a main body having a mounting groove, and rotatably attaching one end of a supporting leg in the mounting groove. The main body may include at least one catching groove in one inner side surface of the mounting groove, and the supporting leg may have a protruding portion protruding outward to be caught by the at least one catching groove.

Other features will be apparent from the following description, including the drawings, and the claims.

BRIEF DESCRIPTION OF THE DRAWINGS

The above and other features and advantages will become apparent from the following description in conjunction with the accompanying drawings, in which.

DETAILED DESCRIPTION

Figure 1:
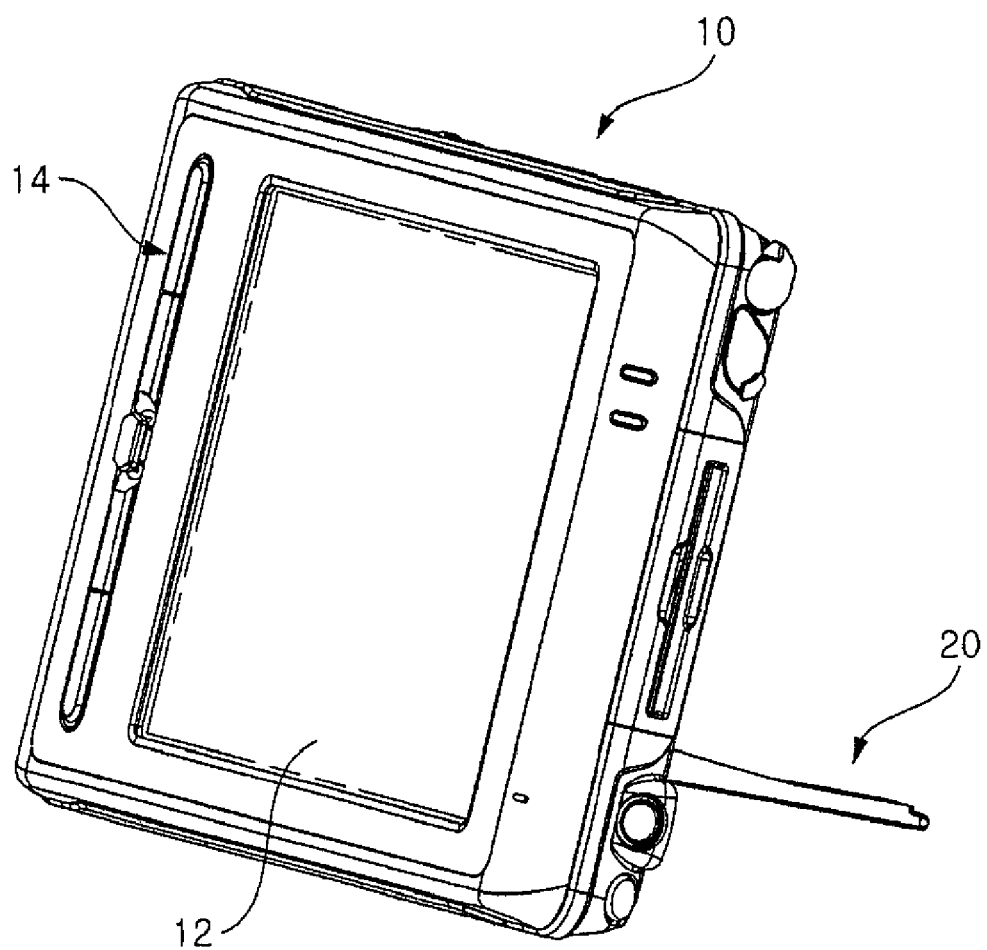
FIG. 1 is a perspective view of a portable terminal device.
Figure 2:
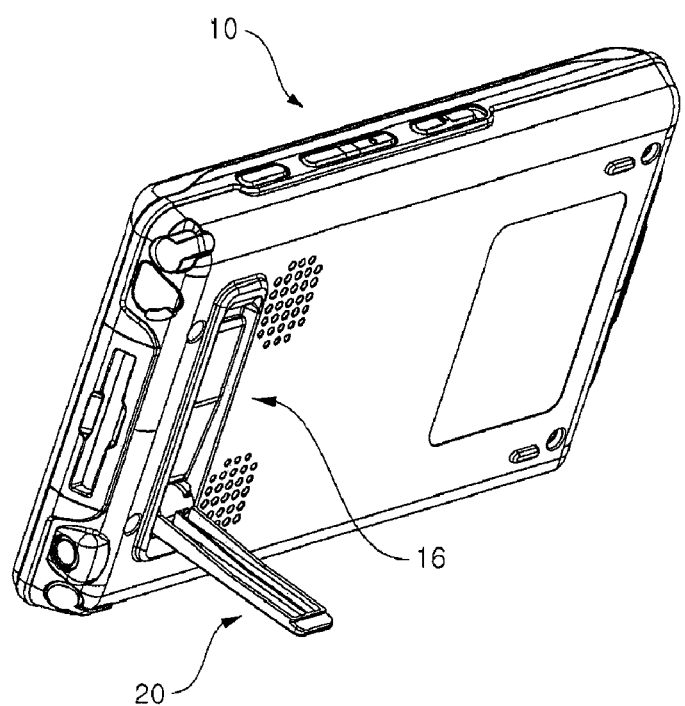
FIG. 2 is a perspective view of the portable terminal device of FIG. 1 as viewed from its rear side.

FIGS. 1 and 2 are perspective views of a portable terminal device that includes a terminal device main body 10 and a supporting leg assembly 20 foldably installed on a rear surface of the main body 10 to support the main body 10 in a standing state.

The terminal device main body 10 includes a display unit 12 for displaying information including a moving picture such as a broadcast program, and control keys 14 for operating the device.

In addition, the supporting leg assembly 20 is installed on the rear surface of the main body 10 to support the main body 10 in a state where it is inclined at a certain angle, as shown in FIG. 2. Further, the supporting leg assembly 20 is configured such that a supporting angle of the main body 10 can be adjusted.

Figure 3:
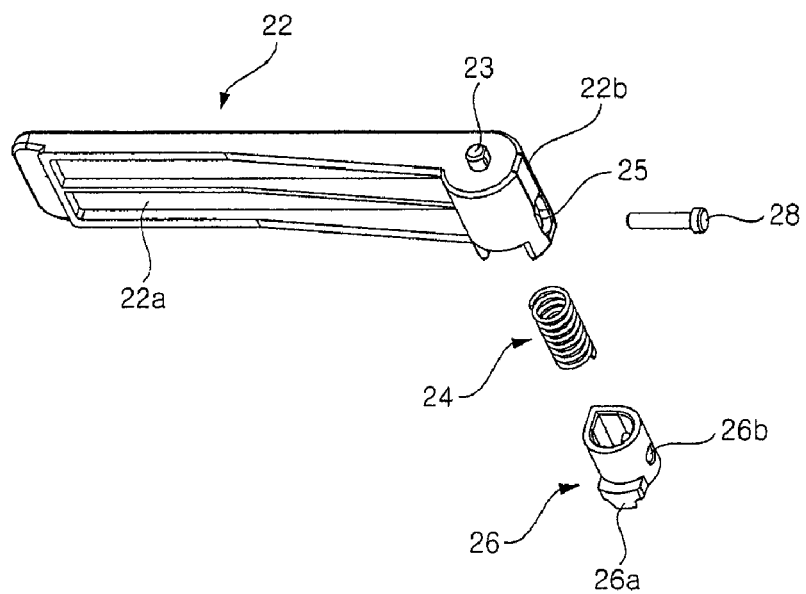
FIG. 3 is an exploded perspective view of a supporting leg assembly.
Figure 4:
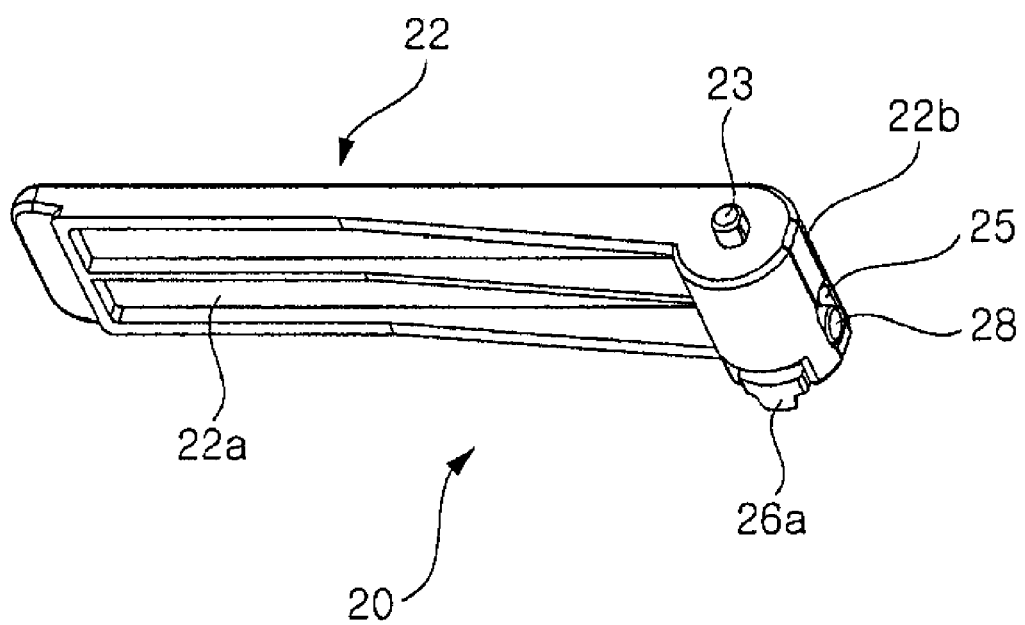
FIG. 4 is a perspective view showing an assembled state of the supporting leg assembly of FIG. 3.

Next, the structure of the supporting leg assembly 20 is described with reference to FIGS. 3 and 4. FIG. 3 is an exploded perspective view of a supporting leg assembly and FIG. 4 is a perspective view showing an assembled state of the supporting leg assembly. The supporting leg assembly 20 is installed such that it can be unfolded or folded in a mounting groove formed in the rear surface of the main body 10. That is, the supporting leg assembly 20 is provided in the mounting groove 16 formed in the rear surface of the main body 10 so that a proximal end of the supporting leg assembly 20 is rotatably supported. Accordingly, a distal end of the supporting leg assembly 20 is rotated about the proximal end which is rotatably supported, and thus can be unfolded outward. In such an unfolded state, the supporting leg assembly 20 supports the main body 10, as shown in FIG. 2.

In order to accommodate the supporting leg assembly 20 in the mounting groove 16 formed in the rear surface of the main body 10, the mounting groove 16 is formed to have a length corresponding to that of the supporting leg assembly 20 and extend in the up and down direction.

The supporting leg assembly 20 includes a supporting leg 22 having a leg portion 22a with a predetermined length and a head portion 22b formed at one end of the leg portion. The head portion 22b is a portion at which the supporting leg 22 is rotatably installed in the mounting groove 16. The head portion 22b is formed in a hollow shape and has one side in an axial direction opened. A support shaft 23 is formed to protrude on the other side (opposite to the open side) of the head portion 22b in order to rotatably support the supporting leg 22.

In addition, a cam member 26 is inserted into the open side of the head portion 22b, and a support shaft (not shown) is also formed on one side of the cam member 26 so as to be coaxial with the support shaft 23. Accordingly, the head portion 22b of the supporting leg 22 is rotatably supported by the support shaft 23 formed on the one side thereof and the support shaft formed on the one side of the cam member 26. Also, rotation supporting grooves (not shown) are formed in both inner side surfaces of the mounting groove 16 so that the pair of support shafts 23 are inserted and rotatably supported in the rotation supporting grooves.

Further, a cam protrusion 26a is formed on one side surface of the cam member 26 to protrude outward (in the radial direction). In addition, the cam member 26 is inserted into the head portion 22b with a spring 24 received therein, thereby being substantially elastically supported by the spring 24 outward.

The cam member 26 is installed and maintained in the head portion 22b by means of a supporting pin 28. That is, in a state where the cam member 26 is inserted in the head portion 22b, the supporting pin 28 is inserted in a support hole 26b of the cam member 26 through an elongated hole 25 formed in a surface of the head portion 22b, so that it is possible to maintain a state where the cam member 26 is inserted in the head portion 22b.

In addition, the cam member 26 is elastically outward supported by the spring 24, and should be configured such that the cam member can move back and forth in the axial direction (in the direction of the support shafts) within a certain distance, which will be described below. Accordingly, the elongated hole 25 of the head portion 22b through which the supporting pin 28 passes is formed to have a certain length (corresponding to the distance within which the cam member moves) in the axial direction.

A state where the cam member 26 so configured is coupled to the supporting leg 22 is shown in FIG. 4. Such a supporting leg assembly 20 is rotatably installed in the mounting groove 16 formed in the rear surface of the main body 10 through the support shafts 23. The support shafts 23 may be inserted in the rotation supporting grooves (not shown) formed in both the inner side surfaces of the mounting groove 16, so that the supporting leg 22 is rotatably supported.

Figure 5:
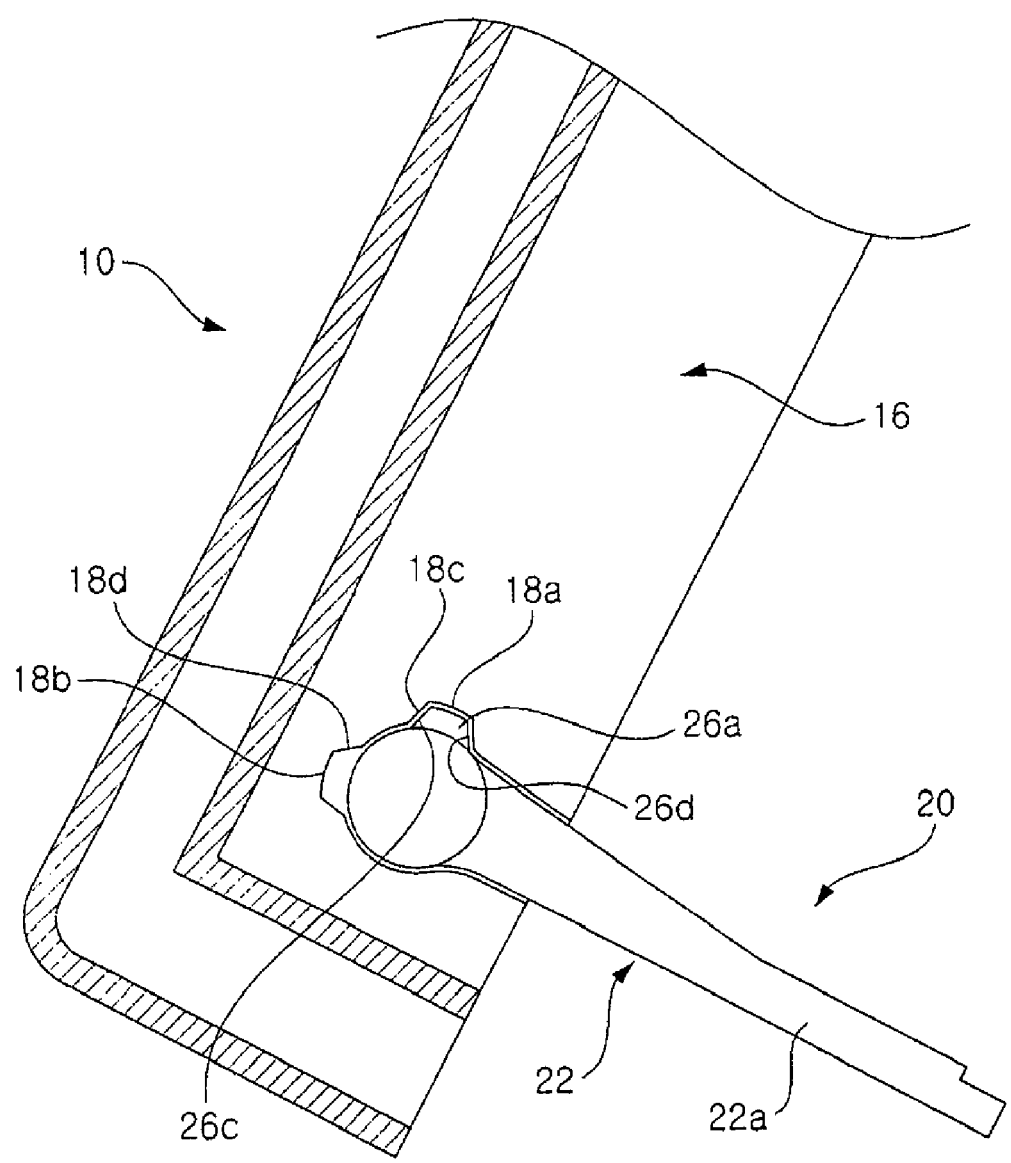
FIG. 5 is an exemplary partial sectional view showing a relationship between the supporting leg assembly and a terminal device main body.

FIG. 5 is an exemplary partial sectional view showing the supporting leg 22 installed in the mounting groove 16. Catching grooves 18a and 18b are formed in one of inner side surface of the mounting groove 16, i.e., one side surface corresponding to the cam protrusion 26a. Although two catching grooves 18a and 18b are illustrated, additional catching grooves may be provided to permit finer adjustment of the tilting angle. The first catching groove 18a catches the cam protrusion 26a when the supporting leg 22 supports the main body 10 to stand at a proper angle (for example, approximately 65° at which television is appropriately watched). The second catching groove 18b catches the cam protrusion 26a when the supporting leg 22 is completely folded in the mounting groove 16. Once the supporting leg 22 is completely folded and received in the mounting groove 16, the cam protrusion 26a is caught by the second catching groove 18b, and thus, the supporting leg 22 is not inadvertently unfolded.

Next, the operation of the supporting leg assembly 20 is described.

FIG. 5 shows the supporting leg 22 supporting the main body 10 at an appropriate angle in a state where the supporting leg assembly 20 is unfolded outward. In such a state, the first catching groove 18a catches the cam protrusion 26a of the cam member 26 of the supporting leg assembly 20. Also, in this state, the cam member 26 is elastically supported by the spring 24 outward (toward the side surface on which the catching grooves are formed). Accordingly, since the cam protrusion 26a is caught to the first catching groove 18a on the basis of a resilient force of the spring 24, the supporting leg 22 can keep the main body 10 to be at a certain angle.

In such a state, if a user wishes to fold the supporting leg 22 and put it in the mounting groove 16, the user rotates the supporting leg 22 upward. Here, each of the catching grooves 18a and 18b has an inclination formed in the rotation direction of the supporting leg 22. In case of the first catching groove 18a as an example, one side surface (a side surface toward which the supporting leg 22 is rotated) of the first catching groove 18a is not a perpendicular surface but an inclined surface 18c with a predetermined inclination. Once the user rotates the supporting leg 22 upward, the cam protrusion 26a passes over the inclined surface 18c as the supporting leg 22 is rotated upward. When the cam protrusion 26a passes over the inclined surface 18c, the cam protrusion 26a is moved within a certain section in the axial direction, wherein this movement direction of the cam protrusion is the direction in which the spring 24 is contracted. That is, when the supporting leg 22 is rotated, the cam protrusion 26a is moved inside the head portion 22b in the axial direction while causing the spring 24 to be contracted.

In addition, once the supporting leg 22 is completely rotated upward and accommodated in the mounting groove 16, the cam protrusion 26a of the cam member 26 is received in the second catching groove 18b. If the cam protrusion 26a is received in the second catching groove 18b as described above, the spring 24 pushes the cam member 26 outwardly in the axial direction, whereby the cam protrusion is elastically seated in the second catching groove 18b.

In this state, if the user wants to unfold the supporting leg 22 again for watching television, the user should grip the supporting leg 22 and rotate and draw it outward. Then, the cam protrusion 26a of the cam member 26 escapes from the second catching groove 18b. At this time, since the second catching groove 18b is formed to have the inclined surface 18d, the supporting leg 22 can be more smoothly rotated. In addition, at this time, the cam member 26 is somewhat moved inward in the axial direction of the head portion 22b while compressing the spring 24.

Subsequently, if the supporting leg 22 is completely unfolded, i.e., in a state as shown in FIG. 5, the cam protrusion 26a of the cam member 26 is elastically caught to the first catching groove 18a, and thus can maintain the main body 10 in a standing state.

In this example, the mounting groove 16 is formed in the rear surface of the main body 10 in the ordinate direction. However, the location and direction of the mounting groove 16 can be variously modified. That is, the mounting groove 16 can be modified as long as the supporting leg 22 having an end rotatably installed in the mounting groove 16 can be rotated and unfolded outward and the other end of the supporting leg can be brought into contact with a base surface to support the main body 10 in a standing state.

In addition, in the aforementioned examples, the side surfaces of the catching grooves 18a and 18b, over which the cam protrusion of the cam member passes, are formed to have inclined surfaces. In addition, both side surfaces of the cam protrusion may be also formed to be inclined. If both side surfaces 26c and 26d of the cam protrusion are formed to be inclined, the cam protrusion can more smoothly pass over the catching groove.

As explained above, the main body 10 can be supported in a standing state by rotating and drawing the supporting leg 22 out of the mounting groove 16 of the main body 10. Therefore, it is convenient to watch television in a state where the portable terminal device stands and it is possible to maintain the portable terminal device at an optimum angle for watching television. In addition, as described above, a plurality of catching grooves are provided, so that the standing angle of the main body 10 can be adjusted, which makes it even more convenient.

Other implementations are within the scope of the following claims.

What is claimed is:

1. A portable terminal device, comprising:
   a main body having a mounting groove formed in a rear surface; and
   a supporting leg having an end rotatably supported in the mounting groove,
   wherein the mounting groove has a length corresponding to that of the supporting leg and,
   wherein the mounting groove has at least one catching groove formed in one inner surface thereof, and
   wherein the supporting leg comprises:
      a head portion formed at the end of the supporting leg, and
      a cam member inserted and supported in the head portion of the supporting leg, the cam member supported by a spring within the head portion to be moveable in an axis of rotation direction of the supporting leg, and the cam member having a cam protrusion protruding outward in a radial direction of the head portion of the supporting leg to be caught by the at least one catching groove by an elastic force of the spring,
      wherein the cam member is supported by a supporting pin in a state where the cam member is inserted in the head portion, the supporting pin passing through an elongated hole formed in the head portion and being inserted into a support hole formed in the cam member, and the elongated hole is formed in the radial direction of the head portion of the supporting leg to have a predetermined length.

2. A method of manufacturing a portable terminal device, comprising:
   providing a main body having a mounting groove formed in a rear surface;
   rotatably attaching one end of a supporting leg in the mounting groove;
   forming the mounting groove to have a length corresponding to that of the supporting leg and extends along a vertical, in relation to the supported portable terminal device, edge of the portable terminal device;
   forming at least one catching groove of the mounting groove in one inner surface thereof;
   forming a head portion at the end of the supporting leg;
   inserting and supporting a cam member in the head portion of the supporting leg, the cam member being supported by a spring within the head portion to be moveable in an axis of rotation direction of the supporting leg, and the cam member having a cam protrusion protruding outward in a radial direction of the head portion of the supporting leg to be caught by the at least one catching groove by an elastic force of the spring; and
   supporting the cam member by a supporting pin in a state where the cam member is inserted in the head portion, the supporting pin passing through an elongated hole formed in the head portion and being inserted into a support hole formed in the cam member, and the elongated hole is formed in the radial direction the head portion of the supporting leg to have a predetermined length.

3. The portable terminal device of claim 1, further comprising:
   a first support shaft formed on one side of the head portion; and
   a second support shaft formed on an outer surface of the cam member,
   wherein the first and second support shaft are supported in rotation supporting grooves formed on both inner side surfaces of the mounting groove, whereby the supporting leg is rotatable.

4. The portable terminal device of claim 1, wherein a side surface of the catching groove toward which the cam member is moved is formed to be inclined.

5. The portable terminal device of claim 4, wherein side surfaces of the cam protrusion nearest to the side surface of the catching groove are inclined, enabling the cam protrusion to smoothly pass over the catching groove.

6. The portable terminal device of claim 1, wherein the mounting groove extends in the up and down direction of the portable terminal device when positioned in an operating orientation.

7. The portable terminal device of claim 1, wherein the mounting groove extends perpendicular to the axis of rotation direction of the supporting leg.

* * * * *